United States Patent Office 3,425,955
Patented Feb. 4, 1969

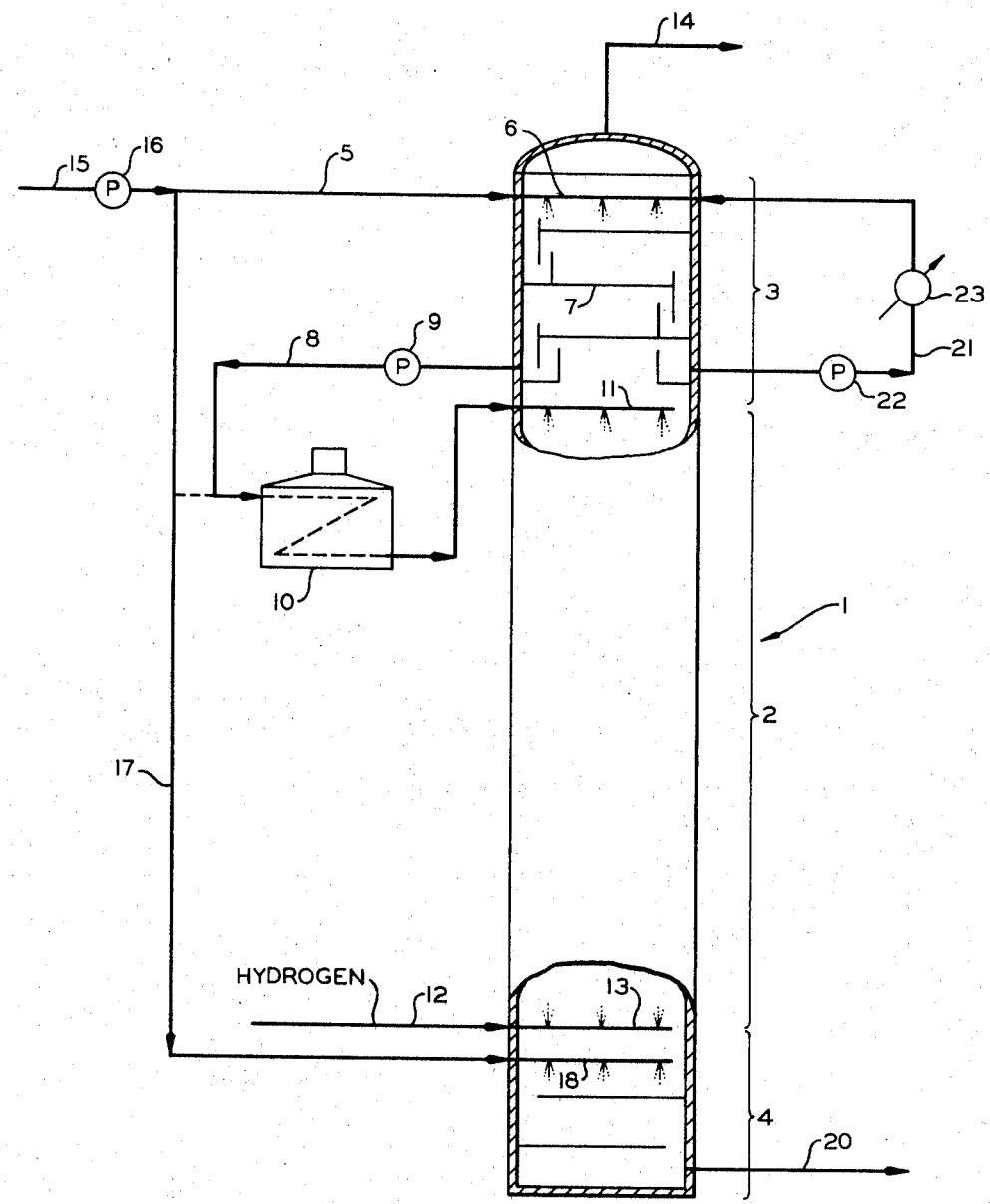

3,425,955
REGENERATION OF ALUMINUM HALIDE CONTAINING CATALYSTS
Harold J. Hepp and Lewis E. Drehman, Bartlesville, Okla., assignors to Phillips Petroleum Company, a corporation of Delaware
Filed Aug. 5, 1965, Ser. No. 477,434
U.S. Cl. 252—411                    7 Claims
Int. Cl. B01j 11/02

ABSTRACT OF THE DISCLOSURE

Method and apparatus for regenerating aluminum halide containing catalysts by employing a cooling section and a scrubbing section disposed about an intermediate regeneration section, the cooling section being cooled with catalyst to be regenerated, catalyst being removed from the scrubbing zone and heated and introduced into said regeneration zone, and catalyst being removed from the scrubbing zone and cooled and reintroduced into the scrubbing zone.

---

This invention relates to a new and improved method and apparatus for regenerating catalyst components. In one aspect this invention relates to a new and improved method for regenerating aluminum chloride catalyst degraded during the conversion of hydrocarbons.

Although this invention will, for the sake of clarity, be disclosed with respect to the regeneration of aluminum chloride-hydrocarbon complexes used in paraffin isomerization and/or alkylation reactions (e.g., the conversion of normal butane to isobutane and the manufacture of diisopropyl by the reaction of isobutane and ethylene), and the like, by treatment with hydrogen, it should be noted at the outset that this invention is broadly applicable to the regeneration of any aluminum chloride or aluminum halide containing catalysts.

The use of aluminum chloride catalysts for the conversion of hydrocarbons is well known. It is further well known that during use the aluminum chloride is gradually converted to an aluminum chloride hydrocarbon sludge. The mechanism of this conversion is not presently completely understood, but apparently the aluminum chloride forms complex compounds with the hydrocarbons undergoing treatment and because of this its catalyst activity is reduced or substantially eliminated. This sludge, hereinafter referred to as complex, has a chemical structure or makeup so complicated as to defy precise analysis. Therefore, unless otherwise specified, the use above and hereinafter of the terms "sludge" or "complex" is meant to denote the reaction product of aluminum chloride with a hydrocarbon or hydrocarbon mixture, which reaction product is composed of aluminum chloride, the remainder being substantially all hydrocarbons.

Heretofore such catalyst complexes have been regenerated by contacting same with hydrogen at elevated temperatures and pressures to increase the aluminum chloride content thereof so that the catalyst can be reused as such for conversion of additional hydrocarbon. A full and complete disclosure of such a regeneration operation is set forth in U.S. Patent 2,293,891, the disclosure of which is hereby incorporated herein by reference.

A substantial problem involved with such regeneration processes is that the aluminum chloride tends to vaporize (sublime) under certain conditions and condense under other conditions which causes vexatious plugging of apparatus employed in the regeneration process and especially piping associated with that apparatus.

It has now been found that such regeneration processes can be carried out and the plugging problems substantially obviated by employing in association with the regeneration section of the regeneration reactor an upper scrubbing section and a lower cooling section. The upper scrubbing section contains means for contacting complex to be regenerated with vapors leaving the regeneration section thereby scrubbing any entrained or otherwise carried catalyst components from this gas.

In a further aspect of the apparatus of this invention means is employed to remove at least part of the complex from the scrubbing section, heat same, and then pass the heated complex into the regeneration section. Also, means is employed to cool at least part of the removed complex and reintroduce same into the scrubbing section to act as a scrubbing agent.

The method of this invention includes scrubbing catalyst components from a substantially gaseous phase formed in the regeneration operation by contacting the gaseous phase with cooler complex which is to be regenerated and cooling the regenerated complex prior to subsequent disposition of same, e.g. reuse as catalyst.

Further according to this invention at least some complex which is removed from the zone in which complex to be regenerated is employed as a scrubbing agent, heated and introduced into the regeneration zone. Also, at least some complex is removed from the scrubbing zone, cooled and reintroduced thereinto as additional scrubbing agent.

Accordingly, it is an object of this invention to provide a new and improved method and apparatus for regenerating catalyst. It is another object of this invention to provide a new and improved method and apparatus for regenerating aluminum chloride-hydrocarbon complex.

Other aspects, objects, and the several advantages of this invention will be readily apparent to those skilled in the art from the description, the drawing, and the appended claims.

In the drawing there is shown a system embodying this invention.

More specifically, in the drawing there is shown a reactor column generally denoted as 1 which has an intermediate regeneration section or zone 2, an upper scrubbing section 3, and a lower cooling section 4. Conduit 5 carries relatively cool, liquid complex into the top of scrubbing section 3 to be sprayed thereonto through sprayer 6. The liquid complex then passes over a series of conventional gas-liquid contactors 7 thereby causing that liquid to intimately contact gases rising from regeneration section 2 and scrubbing aluminum chloride carried thereby therefrom. Gas-liquid contactors can be well known sieves, Koch trays, packing, saddles and the like or combinations of same which are well known in the art.

Liquid complex can then pass, at least in part, out the bottom of scrubbing section 3 directly into regeneration section 2 to be contacted with hydrogen and regenerated in the conventional manner. However, it is presently preferred that at least some of the liquid complex in scrubbing section 3 is removed, preferably from one or more of the lowest gas-liquid contactors, through conduit 8 by pump 9, heated by furnace 10 and then introduced into regeneration section 2, preferably through sprayer 11. A still more preferred mode is to remove through 8 an amount of complex substantially equal to that amount being fed into 3 through 5, thereby preventing any appreciable, or any at all, flow of complex from 3 directly into 2 without first being heated in 10.

Also, if desired, at least some of the liquid complex in section 3 can be removed in the same manner as with conduit 8 but through conduit 21 by pump 22, cooled by heat exchanger 23 and returned to section 3 through spray 6. Liquid can be removed through conduits 8 and 21 simultaneously, consecutively or entirely separately and/or unrelately. The cooled liquid can be introduced to section 3 in any known manner besides spray 6 including a separate spray means.

In the regeneration section hydrogen is introduced into a lower portion thereof through conduit 12 and gas disperser 13, which hydrogen then rises through sections 2 and 3 and out of column 1 through conduit 14 for recovery, treatment, reuse, and the like as desired.

If desired, at least part of the complex pumped through conduit 15 by pump 16 passes through conduit 17 and is sprayed into the upper portion of cooling section 4 by sprayer 18 to effect cooling in that section. It should be noted that in lieu of the use of complex which is to be regenerated, regenerated complex or hydrocarbon to be treated by the regenerated complex can be used in sprayer 18. Further, in lieu of direct cooling, indirect cooling such as by use of an outer cooling jacket around the periphery of column 1 in the area of section 4 can be employed in which case a cooling fluid such as water would be used to cool zone 4 through the walls of column 1. Regenerated complex is removed from section 4 through conduit 20 for subsequent storage, further treatment, or reuse as catalysts as desired.

Regeneration section 2 and cooling section 4 can contain gas-liquid contacting devices similar to those employed in section 3.

If desired, all or any part of the complex in 17 can be passed directly to furnace 10 and then directly in section 2 for regeneration thereof.

As a specific example of operation, aluminum chloride complex containing 58 weight percent aluminum chloride, the balance being substantially all hydrocarbons, is fed through conduit 15 at the rate of 88,000 pounds per day at a temperature of about 100° F. Approximately 44,000 pounds per day are passed through conduit 5 and sprayed onto section 3 through sprayer 6. Similarly, about 44,000 pounds per day of this complex is passed through conduit 17 and sprayed into section 4 through sprayer 18 thereby being utilized as a diluent and quench agent, which in turn adjusts the viscosities of the regenerated complex being removed through conduit 20 to any desired degree.

In a scrubbing section 3 the liquid complex to be regenerated is heated to about 250° F. by contact with the effluent gas from regeneration section 2 before it passes into regeneration section 2. Approximately 44,000 pounds per day of this liquid complex is removed through conduit 8, further heated to about 425° F. by furnace 10 and introduced into regeneration section 2 through sprayer 11. Similar amounts, sufficient to effect the desired cooling, are withdrawn through conduit 21 for cooling and return to section 3. About 1220 pounds per day (2280 cubic feet per barrel of complex treated) of substantially pure hydrogen is introduced into the bottom of section 2 through gas disperser 13.

The complex which is passed through spray 18 to cooling section 4 maintains that section at a temperature below 300° F. so that the regenerated complex removed through conduit 20 is at a temperature of about 260° F. The regenerated complex is removed through conduit 20 at a rate of about 77,000 pounds per day and is preferably cooled to a temperature of about 120° F. before subsequent disposition. The regenerated complex in conduit 20 has an aluminum chloride content of about 65 weight percent, the remainder being substantially all hydrocarbons.

About 12,250 pounds per day of overhead gas is removed from column 1 through conduit 14. This gas has an approximate composition in mol percent of 25.4 hydrogen, 27.9 methane, 22.7 ethane, 18.7 propane, 4.7 butane and 0.6 five carbon atom containing molecules and heavier.

Regeneration zone 2 is operated during the process of the example at a temperature of about 420° F. and a pressure of about 1000 p.s.i.g.

The complex to be regenerated which is used as the feed for column 1 can contain widely varying amounts of aluminum chloride but will generally contain no more than 60 weight percent aluminum chloride.

Although the operating conditions for he regeneration process itself can vary widely depending upon materials and equipment employed, preferred conditions are temperatures of at least 400° F., preferably from about 400 to about 500° F., and pressure of at least 500 p.s.i.g., preferably from about 500 to about 1500 p.s.ig. An amount of hydrogen equivalent to 500 to 5000 cubic feet per barrel of complex treated is used.

By use of this invention and the above-described procedures a regenerated complex containing from about 65 to about 85 weight percent aluminum chloride can be formed depending primarily upon specific conditions of operation chosen.

Reasonable variations and modifications are possible within the scope of this disclosure without departing from the spirit and scope thereof.

We claim:

1. A method for regenerating an aluminum halide containing catalyst comprising regenerating part of said catalyst in a regeneration zone thereby forming a liquid phase of regenerated catalyst and a gaseous phase containing aluminum halide, scrubbing the aluminum halide from said gaseous phase by intimately contacting same in a scrubbing zone with cooler catalyst to be regenerated, removing at least part of the catalyst in said scrubbing zone therefrom, heating at least a portion of said removed catalyst, introducing the heated catalyst into said regeneration zone as catalyst to be regenerated, cooling at least a portion of said removed catalyst, reintroducing said cooled catalyst into said scrubbing zone as a scrubbing agent for said gaseous phase, and cooling said liquid phase prior to removal of same from the operational area by dispersing thereinto cooler catalyst to be regenerated.

2. The method according to claim 1 wherein said liquid removed from said scrubbing zone is removed from a lower extreme of that zone.

3. The method according to claim 1 wherein the scrubbing zone is above and the cooling zone below the regeneration zone, and said liquid removed from said scrubbing zone is removed from a lower portion thereof, and the cooled portion of said removed liquid is sprayed into an upper portion of said scrubbing zone.

4. The method according to claim 1 wherein said catalyst is composed of aluminum chloride, the remainder being substantially all complex hydrocarbon oils and said regeneration is carried out in the presence of hydrogen at a temperature of at least 400° F. and a pressure of from about 500 to about 1500 p.s.i.g.

5. In an apparatus for regenerating aluminum halide containing catalyst, a cooling section and a scrubbing section disposed about an intermediate regeneration section, means for dispersing substantially liquid catalyst to be regenerated into said scrubbing section, first conduit means for removing catalyst from said scrubbing section, heating means for heating at least a portion of said removed catalyst substantially to the regeneration temperature, second conduit means for introducing said heated catalyst into said regeneration section, cooling means for cooling at least a portion of said removed catalyst, third conduit means for introducing the cooled catalyst into said scrubbing section to act as scrubbing agent therein, contactor means in said scrubbing section for effecting intimate gas-liquid contact between gases emanating from the regeneration section and the liquid catalyst to be regenerated passing through said scrubbing section, and cooling means for cooling said cooling section to a temperature below the temperature of the regeneration section, said cooling means including means for dispersing cool liquid catalyst to be regenerated thereinto.

6. The apparatus according to claim 5 wherein said first conduit means for removing liquid catalyst is operatively connected to a portion of said scrubbing section which is closest to said regeneration section.

7. The apparatus according to claim 5 wherein spray means is employed to introduce said cooled complex into said scrubbing section.

References Cited

UNITED STATES PATENTS

| 2,618,074 | 11/1952 | Trainer et al. | 252—411 X |
| 2,797,981 | 7/1957 | Tooke | 208—13 X |
| 3,173,881 | 3/1965 | Schoofs | 252—411 |
| 3,210,292 | 10/1965 | Evans et al. | 252—411 |
| 3,280,213 | 10/1966 | Mullen et al. | 260—683.74 |

DANIEL E. WYMAN, *Primary Examiner.*

CARL F. DEES, *Assistant Examiner.*

U.S. Cl. X.R.

208—13; 260—683.74; 23—288.3